United States Patent [19]

Cuscurida

[11] Patent Number: 4,518,778
[45] Date of Patent: May 21, 1985

[54] POLYMER POLYOLS FROM ALKYLENE OXIDE ADDUCTS OF ALKANOLAMINES

[75] Inventor: Michael Cuscurida, Austin, Tex.

[73] Assignee: Texaco Inc., White Plains, N.Y.

[21] Appl. No.: 513,599

[22] Filed: Jul. 14, 1983

[51] Int. Cl.³ .................. C07D 241/04; C08G 18/28; C07C 125/06
[52] U.S. Cl. .................................... 544/398; 252/182; 521/164; 521/166; 528/73; 528/76; 560/26; 560/115; 560/158
[58] Field of Search .................... 544/398; 528/73, 76; 560/26, 115, 158; 252/182; 521/164, 166

[56] References Cited

U.S. PATENT DOCUMENTS

| | | | |
|---|---|---|---|
| 3,294,751 | 12/1966 | Beitchman | 528/77 |
| 3,325,421 | 6/1967 | Muller | 252/308 |
| 4,089,835 | 5/1978 | König et al. | 252/308 |
| 4,293,470 | 10/1981 | Cuscurida | 560/158 |
| 4,296,213 | 10/1981 | Cuscurida | 544/398 |
| 4,309,532 | 1/1982 | Cuscurida | 544/398 |
| 4,374,209 | 2/1983 | Rowlands | 521/166 |

*Primary Examiner*—Donald G. Daus
*Assistant Examiner*—Cecilia Shen
*Attorney, Agent, or Firm*—Jack H. Park; Kenneth R. Priem; David L. Mossman

[57] ABSTRACT

A polymer polyol made by the reaction of an alkylene oxide adduct of a hydroxyl-containing amine, a polyether polyol of about 3000 to 8000 molecular weight and an organic polyisocyanate is disclosed. This polymer polyol may be used in the manufacture of flexible polyurethane foams. The polymer polyols are more stable than those made by other procedures.

16 Claims, No Drawings

POLYMER POLYOLS FROM ALKYLENE OXIDE ADDUCTS OF ALKANOLAMINES

BACKGROUND OF THE INVENTION

1. Field of the Invention

This invention pertains to the field of polyurethane plastics. The invention more particularly relates to polymer polyols made from alkanolamines, polyether polyols and polyisocyanates.

2. Description of the Prior Art

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2000 to 3000 and above. These polyols are then reacted with polyisocyanate in the presence of water or other blowing agents such as fluorocarbons to obtain polyurethane foams (see, for example, U.S. Pat. No. 2,929,800). The prior art describes modified polyols in which vinyl monomers such as styrene or acrylonitrile or other materials such as the reaction products of toluene diisocyanate and hydrazine hydrate have been included to improve the properties of the polyol and thus, the properties of the resulting foam. However, some of these prior art materials are highly toxic and require in addition, stripping of unreacted vinyl monomers or water of hydration. U.S. Pat. No. 4,107,102 describes the manufacture of polyurethane foam using a polyol containing hydrazine and its adducts.

Ureido-polyols for polyurethanes are known to be made simply by reacting an alkanolamine with an organic isocyanate according to U.S. Pat. No. 3,294,751. No solvent polyol seems to be used.

German Offenlegungsschrift No. 2,110,055 discloses a process for making a polyurethane product whereby a hydroxyl-containing amine is included in the formulation in a one-shot process. That is, the hydroxyl-containing amine is simply included initially with the polyol and the polyisocyanate and a polyurethane product results. The German process does not use a polyurea polymer polyol which is then reacted with a polyisocyanate.

U.S. Pat. No. 3,325,421 discloses the method of making a stable dispersion of a urea in a composition comprising an organic polyisocyanate and a compound having at least two alcoholic hydroxyl groups.

Stable dispersions of polyureas can be prepared from mixtures consisting of hydroxyl-group containing materials, polyamines and polyisocyanates as taught by U.S. Pat. No. 4,089,835. The dispersing media may be a polyether, a polyester, a polyester amide or a polycarbonate, while the polyamine should contain primary or secondary amine groups.

British Pat. No. 2,098,229 discloses that polymer polyols for use in urethane foams may be made by reacting triethanolamine with a polyisocyanate in the presence of a polyol solvent. Polyurea polymer polyols made by the reaction of alkanolamines with polyisocyanates in the presence of polyether polyols and absence of a catalyst, may be stabilized by quenching with a secondary amine as described in U.S. Pat. No. 4,293,470.

Other disclosures concerning the production of polymer polyols by the reaction of alkanolamines with polyisocyanates in a polyol solvent are U.S. Pat. Nos. 4,374,209 and 4,296,213. Particularly, the present invention is an improvement on the latter method in that alkoxylated alkanolamines are used to produce polymer polyols more stable than (no phase separation) those of U.S. Pat. No. 4,296,213.

SUMMARY OF THE INVENTION

The invention is a method for producing a polymer polyol by reacting an alkylene oxide adduct of a hydroxyl-containing amine, a polyether polyol and an organic polyisocyanate.

DESCRIPTION OF THE PREFERRED EMBODIMENTS

The polymer polyol is made by the reaction of an alkylene oxide adduct of a hydroxyl-containing amine, a polyether polyol and an organic polyisocyanate. The hydroxyl containing amine should range in molecular weight range from about 60 to about 200 and preferably from about 60 to about 150. Preferably, the alkanolamine is a trifunctional monoamine, a difunctional monoamine, an aromatic amine or a diamine. Suitable compounds include monoethanolamine, diethanolamine, triethanolamine, 2-(2-aminoethoxyethanol), hydroxyethylpiperazine, N-methylethanolamine 2-hydroxyethyl ethylenediamine, ethylenediamine, aniline and toluenediamine.

The alkylene oxides used to react with the alkanolamine are preferably ethylene oxide, propylene oxide, butylene oxide and mixtures thereof. It is well known to react alkylene oxides with amines, particularly those containing hydroxyl groups, typically in the presence of an alkaline catalyst, such as sodium hydroxide. For example, see the methods described in U.S. Pat. Nos. 3,393,243; 3,535,307; 3,706,714 and 4,166,172, incorporated by reference herein.

The polyether polyol which is used has a hydroxyl number preferably between about 20 and 60. The polyol is generally an alkylene oxide adduct of a polyhydric alcohol with a functionality of from about 2 to about 4. The alkylene oxide may suitably be ethylene oxide, propylene oxide, or 1,2-butylene oxide or a mixture of some or all of these. The polyol will preferably have a molecular weight within the range of from about 2,000 to about 8,000 and more preferably, from about 3,000 to about 7,000. The alkylene oxide is preferably propylene oxide or a mixture of propylene oxide and ethylene oxide.

Most preferably, the polyether polyol solvent is a mixed alkylene oxide/diepoxide adduct of a polyhydric initiator, such as those described in U.S. Pat. Nos. 4,316,991; 4,309,532 and 4,323,658, incorporated by reference herein.

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-tolulene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Since the polymer polyol has by definition free hydroxyl groups, the amount of polyisocyanate used to form the polymer polyol is less than the stoichiometric amount needed to satisfy the active hydrogens of the hydroxyl groups of the polyether polyol and the hydroxyl-containing amine and the active amine hydrogens. Therefore, the ratio of equivalents of alkylene oxide adduct of hydroxyl-containing amine to equivalents of polyisocyanate ranges from about 1 to 4.

Preferably, the combined weight of alkoxylated alkanolamine and polyisocyanate is from about 5 to 30 wt.% of the polyether polyol solvent.

The polyether polyol alkylene oxide adduct of hydroxyl containing amine and polyisocyanate can be successfully reacted without application of external heat and atmospheric pressure although higher temperatures and pressures would also be acceptable.

The polymer polyol prepared from the above ingredients is then incorporated into a formulation which results in a polyurethane product. The polymer polyol may be used in conjunction with a polyisocyanate such as those mentioned above or may be combined with additional polyol such as those mentioned above and reacted with a polyisocyanate to form a resulting polyurethane foam product.

The advantage of the method of my invention is in the preparation of the polymer polyol as a separate entity before incorporating it into a formulation for the preparation of a polyurethane foam product. The German Offenlegungsschrift No. 2,110,055 mentioned in the prior art section of this application mentions a process where a hydroxyl containing amine may be incorporated directly in a polyurethane formulation without first making a polyurea polymer polyol as I have done.

In addition, the polymer polyols of this invention, made with alkoxylated alkanolamines, are more stable than those of U.S. Pat. No. 4,296,213; that is, they do not separate as readily into two phases.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-1-carboxylate, acetylacetoneimine, bisacetylacetone alkylenediamines, salicyclaldeheydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE 1

This example will illustrate the preparation of the polymer polyols of this invention. It will further show the improved stability of these polymer polyols as compared to prior art materials.

Into a 2 liter, three-necked flask equipped with a stirrer, thermometer, dripping funnel, water condenser, and nitrogen source were charged 900 g of a 5100 molecular weight propylene oxide (PO), ethylene oxide (EO), diglycidyl ether of Bisphenol A (DGEBPA) adduct of glycerin (a secondary hydroxyl-terminated polyol), 63.2 g of the two mole PO adduct of triethanolamine (THANOL ®SF-265; made by Texaco Chemical Co.) and 0.06 g of dibutyltin dilaurate. With good agitation, 36.8 g of toluene diisocyanate (TDI) was added from a dropping funnel over a fifteen minute period. With no external heat applied, the reaction mixture was heated by exothermic effects to 35°–40° C. over a three hour period. The resultant product was an off-white, opaque, stable dispersion which had the following properties:

| | |
|---|---|
| Amine content, meq/g | 0.33 |
| Hydroxyl no., mg KOH/g | 50.8 |
| Viscosity, 77° F., cps | 2000 |

By contrast, phase separation occurred when 900 g of the above 5100 molecular weight polyol, 49 g of triethanolamine, 51 g of TDI and 0.06 g of dibutyltin dilaurate were reacted under the above conditions.

EXAMPLE 2

This example will further illustrate the preparation of the polymer polyols of this invention and their improved stability as compared to prior art products.

Using the apparatus and procedure of Example 1, 900 g of a 3500 molecular weight PO/EO/DGEBPA adduct of glycerin, (a secondary hydroxyl terminated polyol sold by Texaco Chemical Co. as THANOL ®F-3550), 63.3 g of THANOL SF-265, 36.7 g of TDI, and 0.06 g of dibutyltin dilaurate were reacted. The resultant product was an off-white, opaque, stable dispersion which had the following properties:

| | |
|---|---|
| Amine content, meq/g | 0.24 |
| Hydroxyl no., mg KOH/g | 60.7 |
| Viscosity, 77° F., cps | 2190 |

By contrast, phase separation occurrred when 900 g of THANOL F-3550, 49 g of triethanolamine, 51 g of TDI and 0.06 g of dibutyltin dilaurate were reacted under the above conditions.

EXAMPLE 3

This example will further illustrate the preparation of the polymer polyols of this invention.

Into a one quart container were charged 200 g of THANOL ®F-3550, 17.5 g of the 6 mole EO adduct of aniline (THANOL TR-380; a product of Texaco Chemical Co.) and 0.02 g of dibutyltin dilaurate. The above mixture was stirred 15 seconds on a drill press. TDI (4.7 g) was then added and the reactants stirred an additional five seconds. The product was an off-white, low viscosity, stable dispersion.

EXAMPLE 4

This example will illustrate the use of the polymer polyols of this invention in the preparation of flexible urethane foams. It will further show that better foams can be prepared by incorporation of the polymer polyol of Example 2 into a high resilience foam formulation.

Formulations, details of preparation, and foam properties are shown in the following table.

| | A | B |
|---|---|---|
| Formulation, pbw | | |
| THANOL SF-5505[1] | 100 | 75 |
| Polymer polyol from Example 2 | — | 25 |
| Water | 3.8 | 3.8 |
| DC-5043 silicone[2] | 2.0 | 1.5 |
| THANCAT ® TD-33[3] | 0.25 | 0.25 |
| NIAX ® A-1[4] | 0.25 | 0.25 |
| THANCAT DM-70[5] | 0.25 | 0.25 |
| Dibutyltin dilaurate | 0.007 | 0.007 |
| 80/20 toluene diisocyanate/MONDUR ® MR[6] | 48.2 | 49.2 |
| Isocyanate index | 1.05 | 1.05 |
| Details of Preparation | | |
| Cream time, sec. | 5 | 6 |
| Rise time, sec. | 110 | 105 |
| Gel time, sec. | 240 | 225 |
| Properties | | |
| Appearance | Foam shrunk badly | Stable foam |
| Density, pcf | | 1.88 |

[1]5500 m.w. high reactivity triol made by Texaco Chemical Co.
[2]Silicone surfactant made by Dow-Corning Corp.
[3]33% triethylenediamine in propylene glycol made by Texaco Chemical Co.
[4]bis-dimethylaminoethylether made by Union Carbide Chemical Corporation
[5]70% dimorpholinodiethyl ether and 30% dimethylpiperazine made by Texaco Chemical Co.
[6]2.7 functionality polymeric isocyanate made by Mobay Chemical Co.

Many modifications may be made in the polyols of this invention without departing from the spirit and scope thereof, which are defined only in the appended claims. For example, the reactant proportions, reaction conditions and modes of additions could be modified to produce a polymer polyol with optimum properties.

I claim:

1. A polymer polyol made by the reaction of an alkylene oxide adduct of a hydroxyl-containing amine, a polyether polyol of about 3000 to 8000 molecular weight and an organic polyisocyanate wherein the ratio of equivalents of alkylene oxide adduct of hydroxyl-containing amine to equivalents of polyisocyanate ranges from about 1 to 4 and wherein the combined weight of adduct and polyisocyanate is about 5 to 30 wt.% of the polyether polyol.

2. The polymer polyol of claim 1 in which the polyether polyol is a secondary hydroxyl-terminated polyol.

3. The polymer polyol of claim 1 in which the alkylene oxide used to make the adduct is selected from the group consisting of ethylene oxide, propylene oxide, butylene oxide and mixtures thereof.

4. The polymer polyol of claim 1 in which the hydroxyl-containing amine is selected from the group consisting of trifunctional monoamines, difunctional-monoamines, aromatic amines and diamines.

5. The polymer polyol of claim 4 in which the hydroxyl-containing amine is selected from the group consisting of monoethanolamine, diethanolamine, triethanolamine, triisopropylamine, 2-(2-aminoethoxyethanol), ethylenediamine, aniline, toluenediamine and hydroxyethylpiperazine.

6. The polymer polyol of claim 1 in which the organic polyisocyanate is selected from the group consisting of aromatic diisocyanates and aliphatic diisocyanates.

7. The polymer polyol of claim 6 in which the organic polyisocyanate is selected from the group consisting of toluene diisocyanate, diphenylmethane diisocyanate, isophorone diisocyanate and methylene bis-cyclohexylisocyanate.

8. The polymer polyol of claim 1 in which the polyether polyol is a mixed alkylene oxide and diepoxide adduct of a polyol initiator.

9. A method for the production of a polymer polyol consisting essentially of reacting an alkylene oxide adduct of a hydroxyl-containing amine, a polyether polyol of about 3000 to 8000 molecular weight and an organic polyisocyanate wherein the ratio of equivalents of alkylene oxide adduct of hydroxyl-containing amine to equivalents of polyisocyanate ranges from about 1 to 4 and wherein the combined weight of adduct and polyisocyanate is about 5 to 30 wt.% of the polyether polyol.

10. The method of claim 9 in which the polyether polyol is a secondary hydroxyl-terminated polyol.

11. The method of claim 9 in which the alkylene oxide used to make the adduct is selected from the group consisting of ethylene oxide, propylene oxide, butylene oxide and mixtures thereof.

12. The method of claim 9 in which the hydroxyl-containing amine is selected from the group consisting of trifunctional monoamines, difunctionalmonoamines, aromatic amines and diamines.

13. The method of claim 12 in which the hydroxyl-containing amine is selected from the group consisting of monoethanolamine, diethanolamine, triethanolamine, triisopropylamine, 2-(2-aminoethoxyethanol), ethylenediamine, aniline, toluenediamine and hydroxyethylpiperazine.

14. The method of claim 9 in which the organic polyisocyanate is selected from the group consisting of aromatic diisocyanates and aliphatic diisocyanates.

15. The method of claim 14 in which the organic polyisocyanate is selected from the group consisting of toluene diisocyanate, diphenylmethane diisocyanate, isophorone diisocyanate and methylene bis-cyclohexylisocyanate.

16. The method of claim 9 in which the polyether polyol is a mixed alkylene oxide and diepoxide adduct of a polyol initiator.

* * * * *